United States Patent
Jannu et al.

(10) Patent No.: US 10,872,002 B2
(45) Date of Patent: Dec. 22, 2020

(54) HYBRID COMPUTING LANDSCAPE EVENT CHARACTERIZATION

(71) Applicant: SAP SE, Walldorf (DE)

(72) Inventors: Shailesh Jannu, Fremont, CA (US); Qin He, San Jose, CA (US); Shyam Ravindranathan, Sunnyvale, CA (US); Sharayu Nargolkar, Palo Alto, CA (US); Kristina Henn-Sass, San Jose, CA (US)

(73) Assignee: SAP SE, Walldorf (DE)

( * ) Notice: Subject to any disclaimer, the term of this patent is extended or adjusted under 35 U.S.C. 154(b) by 85 days.

(21) Appl. No.: 16/116,768

(22) Filed: Aug. 29, 2018

(65) Prior Publication Data

US 2020/0073730 A1 Mar. 5, 2020

(51) Int. Cl.
*G06F 9/54* (2006.01)

(52) U.S. Cl.
CPC .............. *G06F 9/542* (2013.01); *G06F 9/546* (2013.01)

(58) Field of Classification Search
CPC ............ G06F 9/54; G06F 9/546; G06N 20/00
See application file for complete search history.

(56) References Cited

U.S. PATENT DOCUMENTS

| | | | |
|---|---|---|---|
| 2016/0110806 A1* | 4/2016 | Bent ...................... | G06Q 40/04 705/37 |
| 2018/0332088 A1* | 11/2018 | Kaitchuck ............. | H04L 65/607 |
| 2019/0163539 A1* | 5/2019 | Bishop .................. | G06F 9/5083 |
| 2019/0370080 A1* | 12/2019 | Patel ...................... | H04L 43/067 |
| 2019/0394259 A1* | 12/2019 | Park ....................... | H04L 67/10 |

OTHER PUBLICATIONS

Johansson, L., "Part 1: Apache Kafka for beginners—What is Apache Kafka?" (Dec. 13, 2016), pp. 1-10 [retrieved from https://www.cloudkarafka.com/blog/2016-11-30-part1-kafka-for-beginners-what-is-apache-kafka.html].*

Vrbaski et al., "Complex Event Recoginition Notification Methodology for Uncertain IoT Systems Based on Micro-Service Architecture" (Aug. 6-8, 2018), 2018 IEEE 6th International Conference on Future Internet of Things and Cloud (FiCloud), pp. 184-191 [retrieved from ieee.org/abstract/document/8458011].*

7Wikipedia, "Supply Chain" (Jan. 9, 2018), pp. 1-7 [retrieved from https://en.wikipedia.org/w/index.php?title=Supply_chain&oldid=819459254].*

Wikipedia, "Supply Chain" (Aug. 4, 2018), pp. 1-5 [retrieved from https://web.archive.org/web/20180804212343/https://en.wikipedia.org/wiki/Supply_chain].*

Lopez, Napier, "Google Maps now dispaly Uber drivers in real-time" (Jan. 12, 2017), pp. 1-5 [ retrieved from https://thenextweb.com/google/2017/01/12/google-maps-will-now-show-ubers-on-directiontellingthingy/].*

* cited by examiner

*Primary Examiner* — Brian W Wathen
(74) *Attorney, Agent, or Firm* — Jones Day

(57) ABSTRACT

Messaging device data is received from each of a plurality of computing nodes characterizing at least one operational aspect of such computing node. Thereafter, the received messaging data is processed to identify events within such messaging device data. Further, additional contextual information for the identified events is aggregated. Messaging event data is then generated using the aggregated additional contextual information A rules processing microservice executes a plurality of rules implicated by the messaging event data and triggers at least one action specified by a rule based on the execution of the rules. Related apparatus, systems, techniques and articles are also described.

18 Claims, 6 Drawing Sheets

US 10,872,002 B2

HYBRID COMPUTING LANDSCAPE EVENT CHARACTERIZATION

TECHNICAL FIELD

The subject matter described herein relates to the characterization of events from complex computing landscapes including those including Internet of Things (IoT) devices.

BACKGROUND

Complex and heterogeneous IT landscapes are being increasingly deployed which are essentially hybrid in nature. With the advent of IoT, hybrid also implies devices and sensors in addition to applications, systems, business processes and people distributed geographically. Users need to be able to react to risks and anomalies in real-time and across their processes to run agile and streamlined operations. To do this effectively, events must be processed and data aggregated in real-time. As required data resides in multiple business systems and IoT devices, the data needs to be retrieved and processed in real-time from siloed, heterogeneous systems to analyze the impact.

SUMMARY

In one aspect, messaging device data is received from each of a plurality of computing nodes characterizing at least one operational aspect of such computing node. Thereafter, the received messaging data is processed to identify events within such messaging device data. Further, additional contextual information for the identified events is aggregated. Messaging event data is then generated using the aggregated additional contextual information A rules processing microservice executes a plurality of rules implicated by the messaging event data and triggers at least one action specified by a rule based on the execution of the rules.

The processing can be performed by a stream processing engine such as a SPARK stream processing engine.

The received message device data can be organized into topics such as KAFKA topics. Similarly, the generated message event data can be organized into topics such as KAFKA topics.

The rules scheduler microservice can specify when at least a portion of the rules are valid.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the detection and characterization of events within complex computing landscapes including IoT devices and heterogeneous software programs/computing protocols and the like. In particular, the current subject matter is advantageous in that it can assist operational personas to analyze and resolve problems in real-time based on event driven functionality which aggregates and enriches data across devices, sensors and transactional data from applications for generating recommendations to solve operational anomalies. With the current subject matter, data aggregation and enrichment is achieved via micro-services and API's across applications and systems and this presents the need to connect heterogeneous endpoints across systems in the cloud and on-premise including devices. Invoking micro-services synchronously and in real-time to view data poses a challenge in terms of performance and scalability. Therefore, the current subject matter is event driven and the data aggregation is triggered only when an event or anomaly presents itself based on condition executed via rules and an ensuing action framework.

Figure 1:
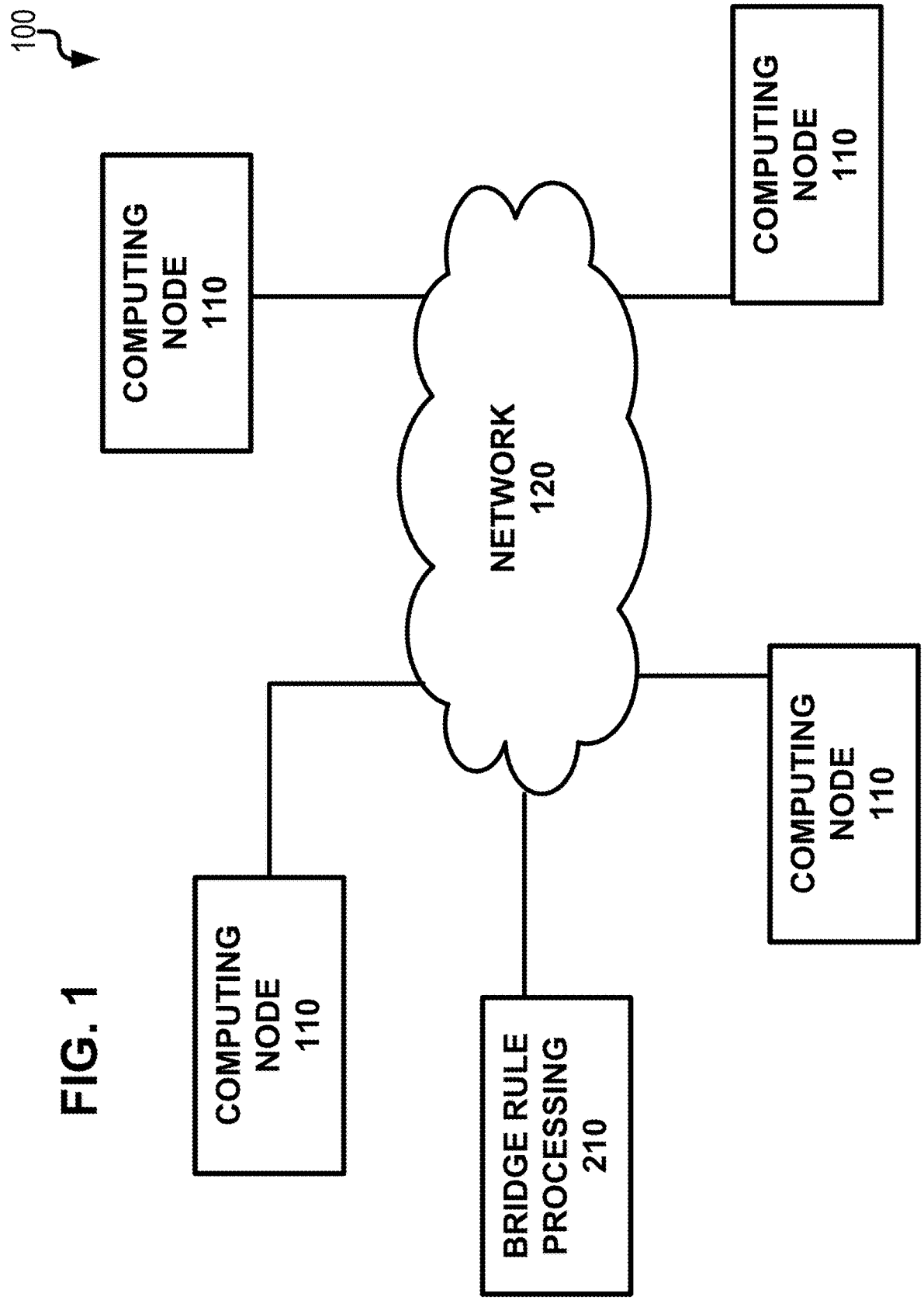
FIG. 1 is a diagram illustrating a sample computing environment.

FIG. 1 is a diagram illustrating a computing environment 100 in which there are a plurality of computing nodes 110 that interact with each other over a network 120 or peer to peer or via other communication mechanisms to execute a software system comprising one or more software applications. The computing nodes 110 can collectively be various computing devices that assist with the management and characterization of a supply chain across multiple physical sites and the like. The computing nodes 110 can be one or more of Internet of Things (IoT) devices, a mobile computing device (e.g., tablet computer, mobile phone, etc.), client computers (e.g., laptops, desktops, etc.) or servers (e.g., web servers, application servers, etc.) or data storage devices (e.g., cloud-computing data sources, databases, etc.). Further, each computing node 110 comprises memory and at least one data processor for executing instructions loaded into the memory. The computing environment 100 can additionally include a bridge rule processing node 210 as will be described in further detail below. The bridge rule processing node 210 can, in some variations, be a dedicated computing device while, in other cases, the bridge rule processing node 130 can be used to execute a distributed software system. The architecture of FIG. 1 can include or otherwise form part of a system architecture such as the SAP LEONARDO IT BRIDGE architecture.

FIG. 1 is a diagram illustrating a computing environment 100 in which there are a plurality of computing nodes 110 that interact with each other over a network 120 or peer to peer or via other communication mechanisms to execute a software system comprising one or more software applications. The computing nodes 110 can collectively be various computing devices that assist with the management and characterization of a supply chain across multiple physical sites and the like. The computing nodes 110 can be one or more of Internet of Things (IoT) devices, a mobile computing device (e.g., tablet computer, mobile phone, etc.), client computers (e.g., laptops, desktops, etc.) or servers (e.g., web servers, application servers, etc.) or data storage devices (e.g., cloud-computing data sources, databases, etc.). Further, each computing node 110 comprises memory and at least one data processor for executing instructions loaded into the memory. The computing environment 100 can additionally include a bridge decision engine 210 as will be described in further detail below. The bridge decision engine 210 can, in some variations, be a dedicated computing device while, in other cases, the bridge rule processing node 130 can be used to execute a distributed software system. The architecture of FIG. 1 can include or otherwise form part of a system architecture such as the SAP LEONARDO IT BRIDGE architecture.

Figure 2:
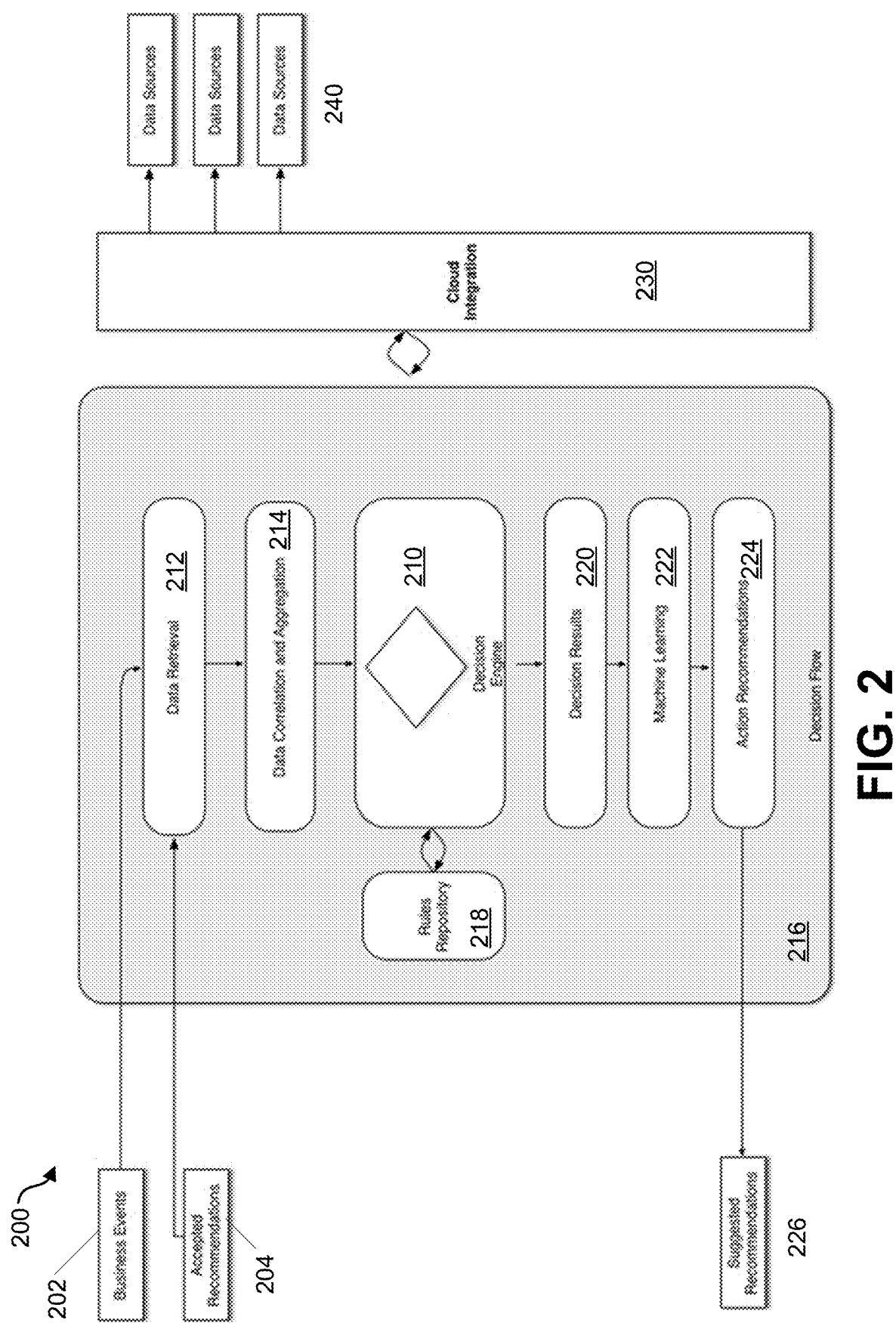
FIG. 2 is a diagram illustrating a bridge rule processing node.

FIG. 2 is a diagram 200 illustrating further details regarding the bridge decision engine 210. The decision engine 210 provides real time action recommendations to the user based on data and events in various systems (such as computing nodes 110) which can be executing various, heterogeneous applications. Example real time action recommendations include, for example, recommendations a certain set of suppliers based on the availability/cost of the items and the rating of the supplier, etc. Event data 202 from one or more of the computing nodes 110 can be used as part of a decision flow 216 executed by the bridge decision engine 210. The event data 202 can comprise or otherwise characterize diverse information/attribute. The event data 202 could characterize a delay event and contain the information of the item that is going to be delayed, the tentative time the item is expected to become available, and a time stamp for the event. In particular, the decision flow 216 can include a data retrieval module 212 which additionally obtains data comprising accepted recommendations 204. Accepted recommendations 204, in this regard, can refer to accepting a recommended supplier suggested by the system. Based on the event data 202 and the accepted recommendations 204, further data can be correlated and aggregated 214. The further data can include, data characterizing a supplier chosen when a certain event condition occurred or data characterizing a supplier rejected for a certain event condition. Using this additional information, a decision engine 216 can access a rules repository 218 to retrieve rules. The set of rules run on the present and historic data to evaluate the condition on the data to determine whether certain actions are triggered by rules (using the correlated data is comprised of real time information from third party systems, history data about events, rules and actions taken on this real time data and aggregated historic data). The decision engine 216 can provide results 220 such as actions specified by rules obtained from the rules repository 218. Machine learning models 222 can provide action recommendations 224 which, in turn, result in suggested recommendations 226. Various type of machine learning models 222 can be utilized, including neural networks, decision trees, random forest. The machine learning models 22 can be trained on the data sets including attributes relating to event data, suggested actions from rules, actions taken, context data from other systems on which the rule ran, the historic aggregated data from other systems, and the like. The decision engine 210 can interface with various data sources 240 via a cloud integration module 230. Depending on the configuration the decision engine can real time pull information to get data that's needed for evaluation from other systems For example the supplier rating from SAP Ariba, Weather forecast from third party weather system, the delay information from SAP Track and Trace system etc.

Figure 3:
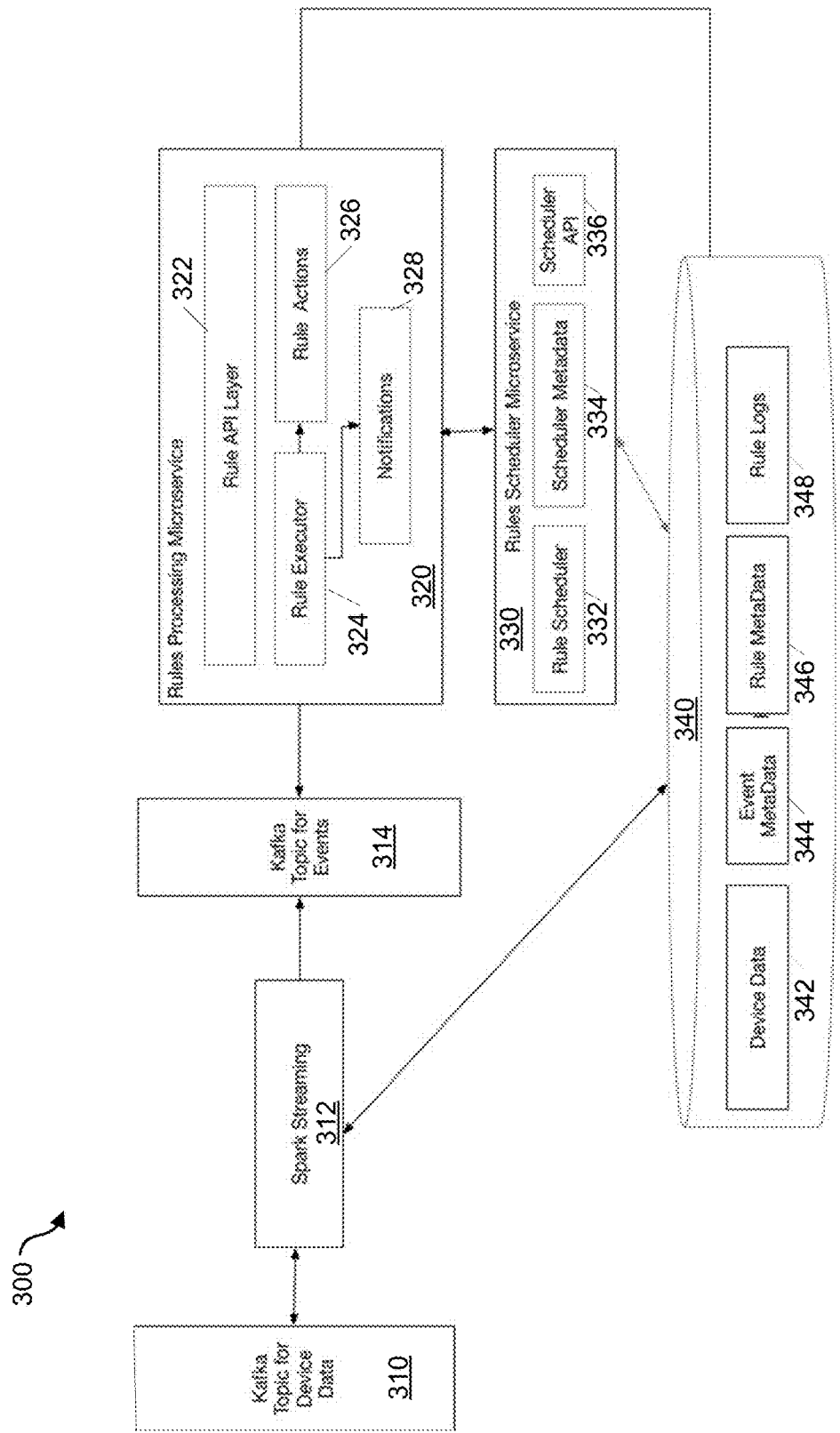
FIG. 3 is a diagram illustrating a sample architecture including a rules processing microservice.

FIG. 3 is a diagram 300 illustrating an example computing landscape for implementing the subject matter described herein. This landscape can use a distributed messaging system, such as Kafka, which provides fast, highly scalable and redundant messaging through a pub-sub model. Other desirable attributes of such a messaging system include allowing a large number of permanent or ad-hoc nodes 110 while, at the same time, being highly available and resilient to node failures and supporting automatic recovery.

The messages can be organized into topics 310 for each device (i.e., computing node 110). Such device data topics can be divided into a number of partitions that allow the topic to be parallelized by splitting the corresponding topic across multiple brokers (which can be on different physical computing devices). Such topic data can be processed by a stream processing engine 312 such as a Spark streaming engine which takes the device data and generates topics for events 314. Stated differently, the raw device data is converted by the stream processing engine 312 into topics characterizing events identified within such raw device data. The streaming processing engine 312 can access a database 340 to store, access, or modify data therein relating to device data 342, event metadata 344, rule metadata 346, and/or rule logs 340. Whenever a new rule is created the rule engine stores this metadata information. The information contains the rules conditions and the information about the objects on which this rule is defined.

The messages within the topic for events 314 can be consumed by a rules processing microservice 320. Such messages are accessed initially via a rule API layer 322. A rule executor 324 determines which rules to execute and whether an rule actions 326 can be initiated. Further, notifications 328 regarding the execution of such rules can be provided (e.g., displayed on an electronic visual display, transmitted to a remote computing device, loaded into memory, stored in physical persistence, etc.). This rule action could also be sending emails, invoking external APIs and storing the result in database.

A rules scheduler microservice 330 can be provided to determine when to execute particular rules. A rules scheduler 332 can define when certain rules are triggered and/or valid. Various metadata 334 characterizing the scheduling can be defined and a scheduler API 336 can provide an interface with the database 340 and/or the rules processing microservice 320.

Figure 4:
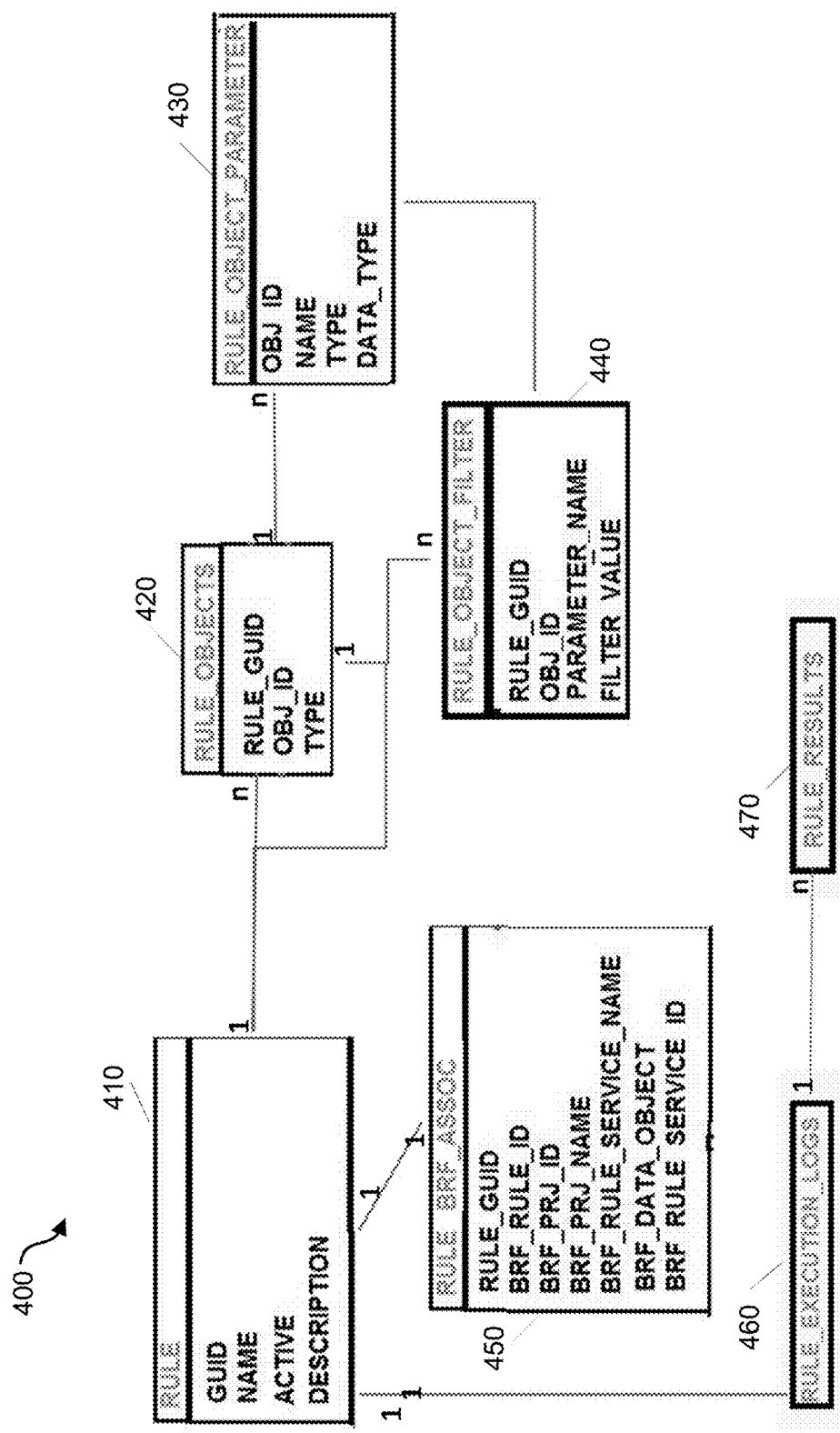
FIG. 4 is a diagram illustrating dependency amongst various objects.

FIG. 4 is a diagram 400 illustrating dependencies amongst rules 410, rule objects 420, rule object parameters 430, rule object filters 440, rule BRF (Business Rules Framework) association 450, rule execution logs 460 and rule results 470. These are repository objects that are used to store information about Rules Metadata, Rule Results and Rule Execution Logs. The rule object stores information about Rule. The results of the rule is stored in Rule Results Tables and Rule Execution Logs. These two tables are also the basis for training the machine learning models 222. The RULE_BRF_ASSOC table is used to store the Association between the rule and the Business Rules Framework Model.

Figure 5:
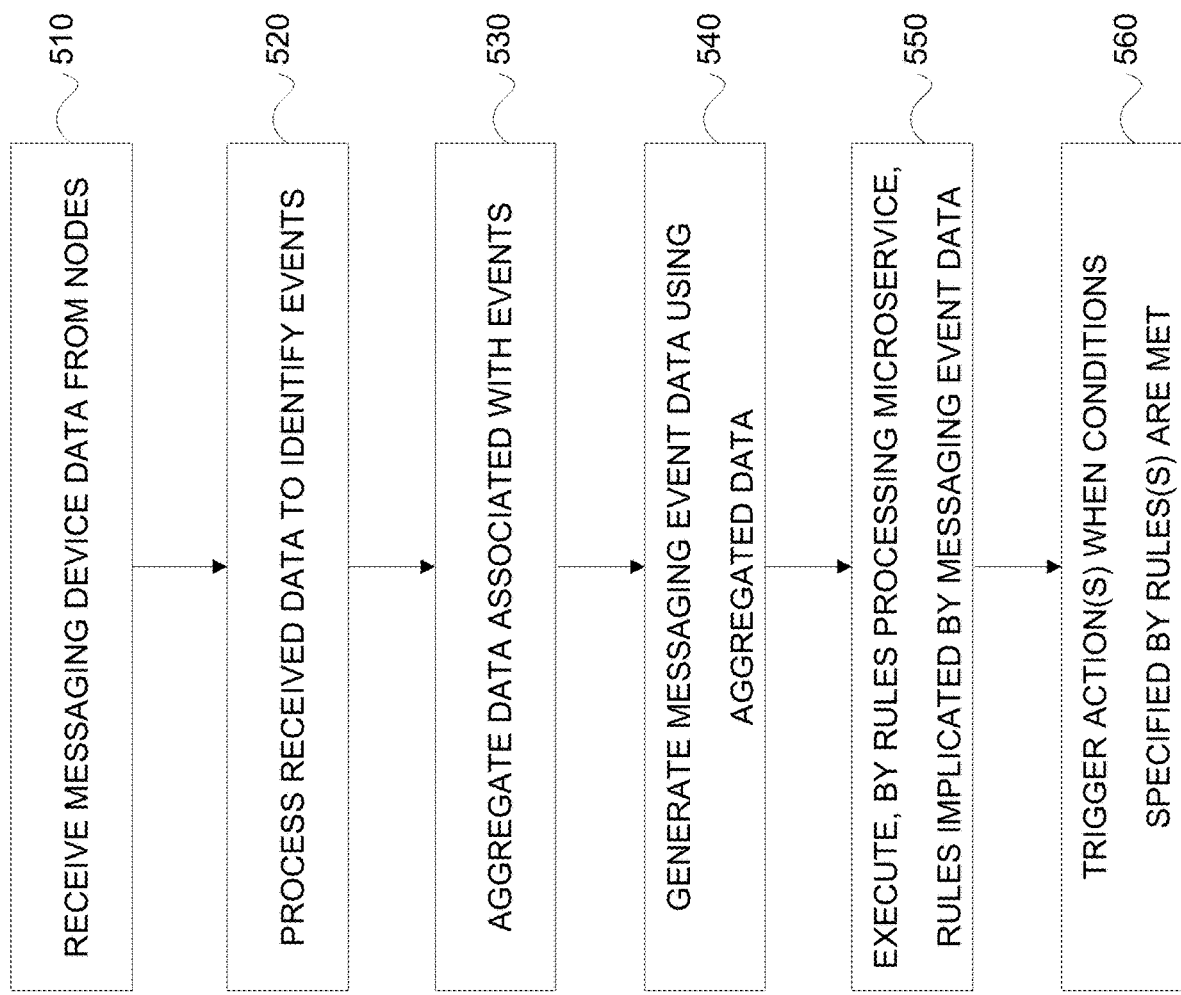
FIG. 5 is a process flow diagram illustrating aggregating of data upon occurrence of certain events and triggering of associated rules.

FIG. 5 is a process flow diagram 500 in which, at 510, messaging device data is received from each of a plurality of computing nodes characterizing at least one operational aspect of such computing node. The received messaging data is processed, at 520, to identify events within such messaging device data. In response, at 530, additional contextual information is aggregated for the identified events. Thereafter, at 540, using the additional contextual information, messaging event data is generated that characterizes the identified events. A rules processing microservice then, at 550, executed a plurality of rules implicated by the messaging event data which can, at 560, trigger at least one action specified by one of such rules.

Figure 6:
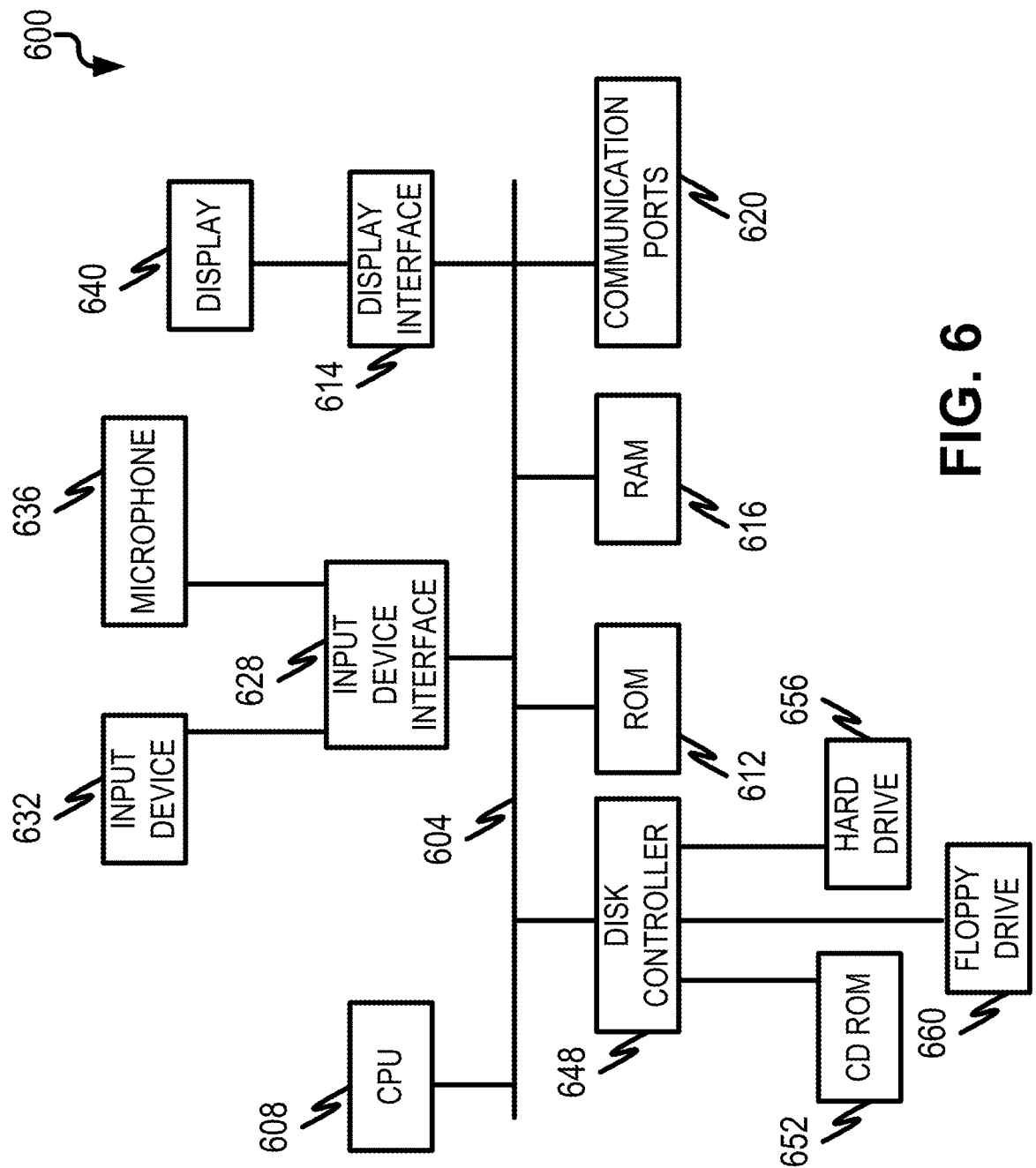
FIG. 6 is a diagram illustrating a computing device for implementing aspects described herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
  receiving messaging device data from each of a plurality of computing nodes characterizing at least one operational aspect of such computing node, the computing nodes being used to manage and characterize a supply chain across multiple physical sites;
  processing the received messaging data to identify events within such messaging device data;
  aggregating additional contextual information for the identified events relating to at least one supplier or potential supplier in the supply chain;
  correlating information comprising real time information from third party systems, history data about events, rules and actions taken on this real time data and aggregated historic data;
  generating, using the aggregated additional contextual information and correlated information, messaging event data characterizing the identified events;
  executing a plurality of rules implicated by the messaging event data; and
  providing, using at least one machine learning model, action recommendations based on the actions, the at least one machine learning model being trained on data sets comprising one or more of: attributes relating to event data, suggested actions from rules, actions taken, context data from other systems on which a rule ran, or historic aggregated data from other systems, the action recommendations being recommendations to solve operational anomalies within the supply chain.

2. The method of claim 1, wherein the processing is performed by a stream processing engine.

3. The method of claim 1, wherein the received message device data is organized into topics.

4. The method of claim 1, wherein the generated message event data is organized into topics.

5. The method of claim 1 further comprising:
  specifying when at least a portion of the rules are valid.

6. A system comprising:
  at least one programmable data processor; and
  memory storing instructions which, when executed by the at least one programmable data processor, implement operations comprising:
    receiving messaging device data from each of a plurality of computing nodes characterizing at least one operational aspect of such computing node, the computing nodes being used to manage and characterize a supply chain across multiple physical sites;
    processing the received messaging data to identify events within such messaging device data;
    aggregating additional contextual information for the identified events relating to at least one supplier or potential supplier in the supply chain, the additional contextual information comprising: data characterizing a supplier chosen when a certain event condition occurred or data characterizing a supplier rejected for a certain event condition;
    generating, using the aggregated additional contextual information, messaging event data characterizing the identified events;
    executing a plurality of rules implicated by the messaging event data; and
    providing, using at least one machine learning model, action recommendations based on the actions, the at least one machine learning model being trained on data sets comprising one or more of attributes relating to event data, suggested actions from rules, actions taken, context data from other systems on which a rule ran, or historic aggregated data from other systems, the action recommendations being recommendations to solve operational anomalies within the supply chain.

7. The system of claim 6 further comprising: a steam processing engine to perform the processing.

8. The system of claim 6, wherein the received message device data is organized into topics.

9. The system of claim 6, wherein the generated message event data is organized into topics.

10. The system of claim 6, wherein the operations further comprise:
  specifying when at least a portion of the rules are valid.

11. A non-transitory computer program product storing instructions which, when executed by at least one programmable data processor forming part of at least one computing system, implement operations comprising:
  receiving messaging device data from each of a plurality of computing nodes characterizing at least one operational aspect of such computing node, the computing nodes being used to manage and characterize a supply chain across multiple physical sites;
  processing the received messaging data to identify events within such messaging device data;
  aggregating additional contextual information for the identified events relating to at least one supplier or potential supplier in the supply chain;
  generating, using the aggregated additional contextual information, messaging event data characterizing the identified events;
  executing a plurality of rules implicated by the messaging event data to result in actions specified by the executed rules; and providing, using at least one machine learning model, action recommendations based on the actions, the at least one machine learning model being trained on data sets comprising attributes relating to event data, suggested actions from rules, actions taken, context data from other systems on which a rule ran, and historic aggregated data from other systems, the action recommendations being recommendations to solve operational anomalies within the supply chain.

12. The computer program product of claim 11, wherein the processing is performed by a steam processing engine.

13. The computer program product of claim 11, wherein the received message device data is organized into topics.

14. The computer program product of claim 11, wherein the generated message event data is organized into topics.

15. The computer program product of claim 11, wherein the operations further comprise:

specifying when at least a portion of the rules are valid.

16. The computer program product of claim 11, wherein the machine learning model is selected from a group consisting of: a neural network, a decision tree, or a random forest.

17. The method of claim 1, wherein the machine learning model is selected from a group consisting of: a neural network, a decision tree, or a random forest.

18. The system of claim 6, wherein the machine learning model is selected from a group consisting of: a neural network, a decision tree, or a random forest.

* * * * *